United States Patent [11] 3,625,933

| [72] | Inventor | Robert P. Coyle |
| | | Anderson, Calif. |
| [21] | Appl. No. | 872,416 |
| [22] | Filed | Oct. 29, 1969 |
| [45] | Patented | Dec. 7, 1971 |
| [73] | Assignee | U.S. Plywood-Champion Papers Inc. |
| | | New York, N.Y. |

[54] DE KHOTINSKY CEMENT
6 Claims, No Drawings

| [52] | U.S. Cl. | 260/97, 106/236 |
| [51] | Int. Cl. | C08h 11/02 |
| [50] | Field of Search | 260/97; 106/236 |

[56] References Cited
UNITED STATES PATENTS

| 2,301,253 | 11/1942 | Caplan | 260/97 |
| 3,228,782 | 1/1966 | Skeist | 106/236 |
| 3,216,842 | 11/1965 | Skeist | 106/236 |
| 3,390,049 | 6/1968 | Rednick | 260/97 |

Primary Examiner—Hosea E. Taylor
Assistant Examiner—William E. Parker
Attorneys—James M. Heilman and Heilman & Heilman ABSTRACT: A De Khotinsky-type cement is made by reacting shellac and a polyalcohol in the molten state in the presence of a small amount of a basic catalyst. The cement has excellent adhesive properties and can be used as a thermoplastic filler and as a binder. The tensile strength of steel to wood bonds made with the cement ranges from 400 to 700 p.s.i., and steel to steel bonds of 1,000 p.s.i.

DE KHOTINSKY CEMENT

The present invention relates to a novel De Khotinsky-type cement which is particularly useful for causing various materials, in particular metals, to steadfastly adhere to wood.

A De Khotinsky-type cement is made by reacting shellac and a polyalcohol in the molten state in the presence of a small amount of a basic catalyst. The cement has excellent adhesive properties and can be used as a thermoplastic filler and as a binder. The tensile strength of steel to wood bonds made with the cement ranges from 400 to 700 p.s.i., and steel to steel bonds of 1000 p.s.i.

The term: "De Khotinsky Cement" is generic to a group of cements which contain shellac as their primary binding agent. At one time, this cement was prepared by heating a pine tar, adding shellac and maintaining the temperature of the mixture at 100° C. for an hour. Later the cement was improved by changing its composition to 100 parts of flake shellac and 15–30 parts of a plasticizing agent which instead of pine tar could be creosote or mixtures of similar substances such as guiacol, cresol and other low-melting, high-boiling phenols, trimethylene glycol or other slightly oxygenated organic solvents of high-melting point. Still later, the cement's formulation was modified to include "vistanex" (Trademark, Enjay Co.), a high molecular weight hydrocarbon polymer produced by polymerizing isobutylene.

Currently, commercially available De Khotinsky cement sells for about 10 dollars a pound and this renders it prohibitively expensive for certain applications.

It has now been found that a De Khotinsky-type cement suitable for many applications and of low cost can be made by reacting shellac and a polyalcohol in the molten state in the presence of a small amount of base. The hardness, flexibility and tensile strength of the resulting cement can be varied considerably by merely changing the proportion of shellac to polyalcohol, or by using higher molecular weight polyalcohols.

It is thus a main object of the claimed invention to provide an improved De Khotinsky-type cement. A further object of the invention is to provide a cement of this type which can be made at low cost. Additional objects will appear hereinafter.

The claimed cement comprises shellac and a polyalcohol between which there has been brought about a base-catalyzed ester exchange involving the alcohol groups and the ester groups of the shellac. The shellac alone is brittle and will not wet the surface of wood; the polyalcohol serves as both plasticizer and wetting agent. It should be noted that while good hot melt adhesives can be obtained by simply melting the shellac and a glycol and mixing, maximum strength and wood adhesion are only obtained with the product obtained by chemically reacting the two under the conditions herein disclosed.

The shellac suitable for the claimed invention can be of any grade, orange or lemon. The polyalcohol can be a glycerol, a polyethylene glycol, polypropylene glycol or any natural or synthetic high or low-molecular weight alcohol as well as some alcohol esters and combinations of alcohols and esters.

The basic catalyst suitable for use in the cement can be an alkali metal hydroxide such as sodium hydroxide, a tertiary amine such as triethylamine or a secondary amine such as diethylamine.

The shellac is employed in proportions which range from about 9.9 to 1:1 relative to the weight of polyalcohol used and the basic catalyst can constitute from 0.25 percent to 5 percent by weight of the cement. The more alcohol present, the more plastic the resulting cement. Optionally, any standard filler may also be incorporated in the formulation.

The cement may be made by mixing together shellac and a polyalcohol, melting the mixture at about 130° to 170° C., adding catalyst and stirring until the mixture becomes homogenous, with the high temperature being preferred. The mixture is then allowed to stand at a temperature above the melting point for 10 minutes or more, poured into molds and cooled. Cooling may be accomplished with ice which is a convenient method for making it hard enough to grind.

The cement of the invention gives metal to wood bonds having a tensile strength of 400 to 700 p.s.i. before wood failure. This performance compares favorably with that of the commercially available costlier cement.

This invention is further illustrated by the following examples:

EXAMPLE 1

A cement was made by melting at 130°–170° C., 8 parts by weight of orange or yellow shellac with 2 parts of polyethylene glycol, molecular weight 4000, and adding 0.5 percent sodium hydroxide (50% wt. vol.). The temperature was maintained above the melting point for at least 10 minutes and stirring was continued during that time. The cement was then cooled in ice and ground to proper size.

Further tests showed that a cement made using polyethylene glycol (mol.wt. 29,000) in the usual 4:1 proportion with shellac gave better metal to wood bonds with predominately wood failure (ave. 630 p.s.i.) on maple. The best results were obtained with a 4:1 ratio of orange shellac to polyethylene glycol (mol. wt. 29,000).

Test tabs were glued to sanded maple and pine boards using both the commercial cement and the cement above made. An average pull of 500 p.s.i., as determined by a tensionmeter was required to break away the tabs from the boards for both cements. The respective cements were then tried on particle boards. Face tabs were glued and pulled off. No difference in the cements could be noticed. The importance of this observation can be appreciated if it is remembered that the claimed cement only costs 50 cents a pound to make, while the commercially available De Khotinsky cement sells for 10 dollars a pound.

EXAMPLES 2 to 4

Similar results as in example 1 were obtained using a 4:1 ratio of shellac to polyethylene glycol and a 3:1 ratio.

Polyethylene glycol having a molecular weight of 4000 and 6000 was found to give good results.

EXAMPLE 5

A cement was also made from polyethylene glycol (mol. wt. 20,000) and shellac; 8 parts shellac and 2 parts polyethylene glycol (mol. wt. 20,000), 2.5 percent caustic soda, which seems to have superior wood holding properties to that of the commercial cement. Eighty to 95 percent wood failure was observed for this cement as compared to less than 50 percent of the commercial cement. Metal to metal bonds were made using the De Khotinsky cement with polyethylene glycol (mol. wt. 20,000), and the commercial cement both pulled 1000 p.s.i.

On maple the commercial cement pulled about 500 p.s.i. and that made with the polyethylene glycol 20,000 pulled around 650 p.s.i. with wood failure rather than glue failure as in the case of the commercial cement.

The cements of the invention which contain a higher ratio of the polyalcohol were found suitable also as binders for the fabrication of particle board from wood particles.

The embodiments of the invention in which an exclusive property or privilege is claimed are defined as follows:

1. A cement consisting of a base-catalyzed reaction product of shellac and a polyalcohol selected from the class consisting of polyethylene glycol and polypropylene glycol, the ratio of shellac to polyalcohol in said reaction product being from 9.9:1 to 1:1 and said polyalcohol having a molecular weight in the range from about 4,000 to 20,000.

2. The cement according to claim 1 wherein there is used sodium hydroxide as the catalyst.

3. The cement according to claim 1 wherein the shellac is orange shellac and the polyalcohol is polyethylene glycol having a molecular weight of around 20,000 the ratio of shellac to polyethylene glycol being about 4:1.

4. A process for making a De Khotinsky type cement which consists of mixing 9.9 to 1.0 parts by weight of shellac with 1.0 parts by weight of a polyalcohol selected from the class consisting of polyethylene glycol and polypropylene glycol, said polyalcohol having a molecular weight in the range from about 4,000 to 20,000, melting the mixture at a temperature in the range from about 130° to 170° C., thereafter adding about 0.25 percent to 5.0 percent by weight of a base catalyst, stirring the mixture until it becomes homogeneous, holding the homogeneous mixture above the melting point for at least 10 minutes and thereafter cooling the same.

5. The process according to claim 4 wherein said polyalcohol is polyethylene glycol.

6. The process according to claim 4 wherein the polyalcohol is polyethylene glycol having a molecular weight ranging from about 4000 to about 20,000 and wherein the weight ratio of shellac to polyethylene is about 4 to 1.

* * * * *